United States Patent
Savant (10) Patent No.: US 7,965,002 B2
(45) Date of Patent: Jun. 21, 2011

(54) HELICAL CONDUIT ENABLED FOR CASTING INSIDE A HOUSING

(75) Inventor: Satish D. Savant, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 256 days.

(21) Appl. No.: 12/246,513

(22) Filed: Oct. 7, 2008

(65) Prior Publication Data

US 2010/0085706 A1    Apr. 8, 2010

(51) Int. Cl.
*H05K 7/20*    (2006.01)
(52) U.S. Cl. ............................................ 310/52; 310/58
(58) Field of Classification Search .............. 310/52–59, 310/88, 89; 361/689
See application file for complete search history.

(56) References Cited

U.S. PATENT DOCUMENTS

| | | | |
|---|---|---|---|
| 4,120,021 A * | 10/1978 | Roush | ........................... 361/711 |
| 4,295,067 A | 10/1981 | Binder et al. | |
| 4,621,210 A | 11/1986 | Krinickas, Jr. | |
| 4,818,906 A | 4/1989 | Kitamura et al. | |
| 5,271,248 A | 12/1993 | Crowe | |
| 5,424,593 A | 6/1995 | Vaghani et al. | |
| 5,798,586 A | 8/1998 | Adachi | |
| 6,184,599 B1 | 2/2001 | Okabe et al. | |
| 6,222,289 B1 * | 4/2001 | Adames | ......................... 310/54 |
| 6,617,716 B2 | 9/2003 | Ishida | |
| 6,750,572 B2 | 6/2004 | Tornquist et al. | |
| 6,843,303 B2 * | 1/2005 | Siak et al. | ....................... 164/12 |
| 2002/0096952 A1 * | 7/2002 | Scott | ............................... 310/89 |

* cited by examiner

*Primary Examiner* — Quyen Leung
*Assistant Examiner* — Naishadh N Desai
(74) *Attorney, Agent, or Firm* — Janda M. Carter; Miller, Matthias & Hull (57) ABSTRACT

The present disclosure is directed to a fluid-cooled housing for an electric device having an outer surface and an inner surface, the inner surface defining, at least in part, a housing cavity having a longitudinal axis, an end wall continuous with the inner surface. The inner surface having a plurality of core print openings along the longitudinal axis, and a helical conduit integrated within the housing between the outer and inner surfaces along the axis formed from a helical coil core having two or more laterally extending tabs which form the core print in two or more planes.

10 Claims, 7 Drawing Sheets

HELICAL CONDUIT ENABLED FOR CASTING INSIDE A HOUSING

TECHNICAL FIELD

The present disclosure relates generally to an electric device such as a motor, generator or alternator, and more specifically to a helical conduit enabled for casting inside an electric device.

BACKGROUND

Switched Reluctance (SR) electric machines such as, for example, motors and generators may be used to generate mechanical power in response to an electrical input or to generate electrical power in response to a mechanical input. Magnetic, resistive, and mechanical losses within the motors and generators during mechanical and electrical power generation cause a build up of heat, which may be dissipated to avoid malfunction and/or failure of the device. One of the limitations on the power output of the electric generators may be the capacity to dissipate this heat.

Figure 7:
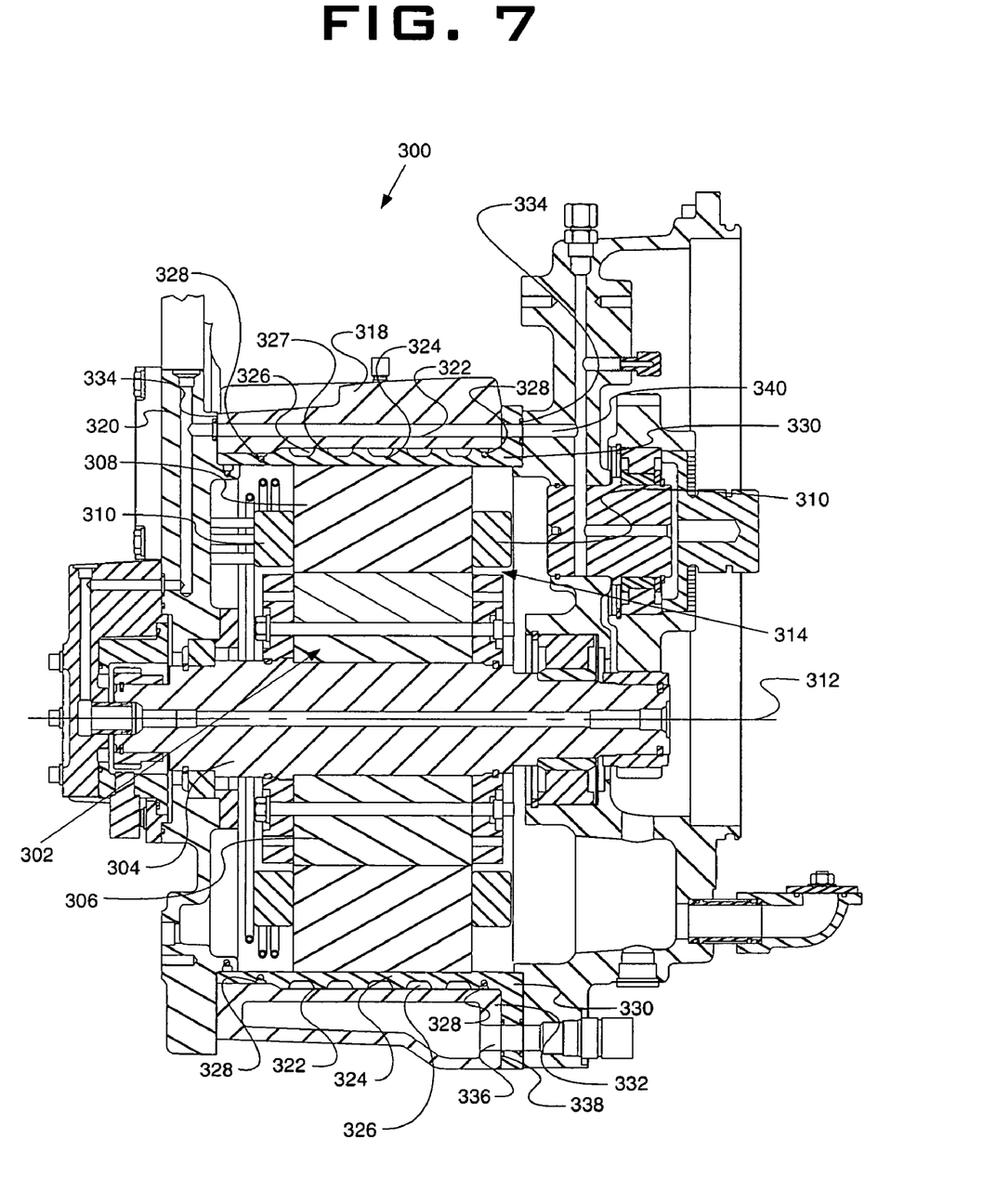
FIG. 7 is an illustration of a prior art liquid-cooled generator.

One example of a liquid cooled generator is depicted in FIG. 7. The generator 300 generally includes a rotor assembly 302 including a rotor shaft 304 with steel laminations 306. Surrounding the rotor assembly 302 is stator assembly 308, which includes a plurality of stator coils 310. Rotor 302 is configured for rotation about axis 312 within stator 308 for generation of electrical power in a conventional manner.

The stator 308 and rotor 302 are disposed within a cavity 314 defined by a generator housing including a front housing 316, middle housing 318, and rear housing 320, with middle housing 318 including an inner surface 322. Fitted against inner surface 322 is a cooling sleeve 324 having a series of grooves 326 forming a cooling passage when outer surface 327 of sleeve 324 is mated against inner surface 322. O-rings 328 are positioned in the sleeve surrounding the grooves 326 to prevent leakage of coolant. The sleeve includes a radially extending flange 330 being positioned between front housing 316 and middle housing 318. An upper axial lubricant/cooling bore 340 passes through the front housing 316, flange 330, middle housing 318, and rear housing 320, sealed by O-rings 334. Similarly, a lower lubricant/cooling sump 336 is sealed by O-rings 338 between the flange 330, front 316, and middle 318 housings.

One method of dissipating heat within a generator includes a fluid cooled electric device having outer and inner surfaces that define a housing cavity having a longitudinal axis with a helical conduit integrated within the housing between the outer and inner surfaces thereof, along the axis. U.S. patent application Ser. No. 11/975,612 (the '612 application) to Savant teaches such a liquid cooled switched reluctance electric machine that includes a helical conduit integrated within the housing between the outer and inner surfaces thereof, along the axis.

However, coring a continuous internal helical cooling conduit is a challenge, from both technical and cost standpoints. One major factor is the inherent springiness of the conduit, due to its spiral geometry. As a result, the core may shift in diameter and length resulting in casting rejects. Core flex may also occur when sand is poured or compacted in the mold, leading to inconsistency between any two castings. Also, the thermal forces generated during the solidification process may cause the core to compress axially, requiring access holes to clean sand from the cored cooling grooves after the housing is cast. Additionally, the cost associated with the tooling required for coring a continuous helical conduit may be prohibitive.

The disclosed method is directed to overcoming one or more of the challenges set forth above.

SUMMARY

The present disclosure is directed to an apparatus and method to enable casting of a helical conduit inside an electric device housing involving a fluid-cooled housing for an electric device having an outer surface and an inner surface, the inner surface defining, at least in part, a housing cavity having a longitudinal axis, an end wall continuous with the inner surface. The inner surface having a plurality of core holes along the longitudinal axis, and a helical conduit integrated within the housing between the outer and inner surfaces along the axis formed from a helical coil core having two or more laterally extending tabs as core prints.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
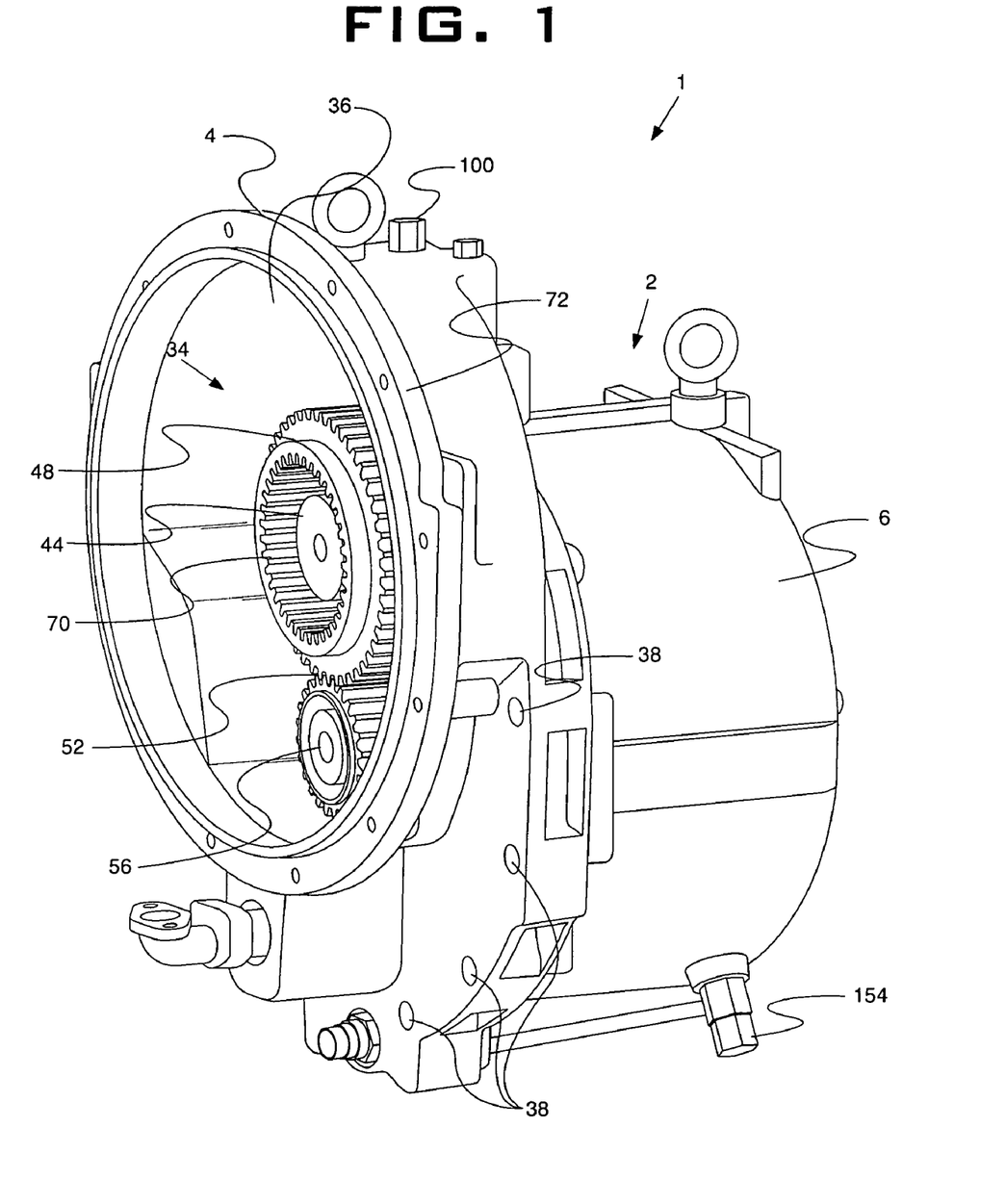
FIG. 1 is a perspective view in accordance with one embodiment of the disclosed electric device.

FIG. 1 illustrates a rotary electric device 1, such as a generator, motor, or alternator, particularly a switched reluctance electric device. Such devices are typically employed in connection with various machines to generate electric power to convert electrical power to mechanical output. For example, such devices may be employed as a portion of a mobile machine such as, for example, a dozer, an articulated truck, an excavator, or any other mobile machine known in the art, with electric machine 16 functioning as the main propulsion unit. It is also contemplated that electric device 1 may form a portion of a stationary machine such as a generator set, pump, or similar machines.

The device 1 generally includes a housing 2 that may consist of a front housing 4 and a rear housing 6, the housing 2 containing a stator assembly 8 having a stator coil 10. The stator assembly 8 is disposed within housing cavity 12 at least partially surrounding a rotor assembly 14 having a steel lamination, the rotor assembly 14 being operatively connected to a power source (not shown) for rotation about an axis, thereby generating electrical power in a conventional manner.

Figure 2:
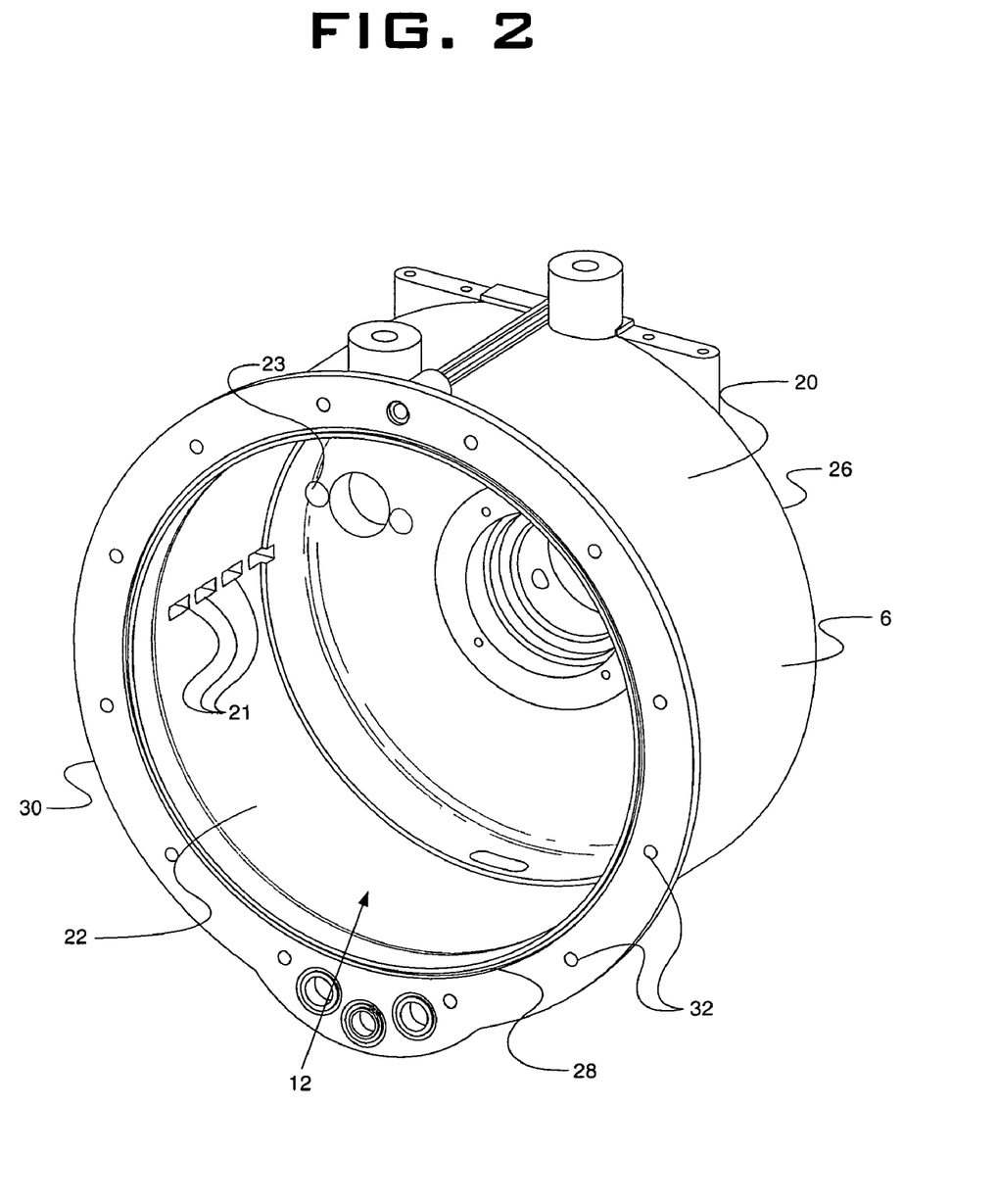
FIG. 2 is a perspective view of a housing of the device of FIG. 1.

Referring to FIGS. 1 and 2, rear-housing 6 may be generally cylindrical, having an outer surface 20 and an inner surface 22 defining inner cavity 12, which is disposed about a central axis. Enclosing one end 26 of the housing cavity 12 is rear wall 24 that is continuous with axial portion and inner surface 22 of the housing. "Continuous" refers to the fact that the components are unitary, formed of a single, cast piece. However, in an alternative embodiment, the rear wall 24 (or a rear portion of the housing 2) may be formed of a separate component (for example, see prior art FIG. 7). Extending radially from a front end 28 of rear housing 6 is a generally annular flange 30 having a series of circumferentially disposed, spaced holes 32 for connection of the rear housing 6 to the front housing 4.

Front housing 4 defines the forward end of housing cavity 12, and also at least partially defines a gear cavity 34. Front housing 4 includes a radially extending wall 36 that includes a series of bolt holes which are aligned with the holes 32 of rear housing 6 for securing the two together. Rotor assembly generally includes rotor shaft 56, including pinion gear 52, and a steel lamination coaxial with the rotor shaft 56. A steel lamination may, for example, be fastened to the rotor shaft 56 by interference fit, welding, threaded fastening or any other appropriate manner.

Figure 3:
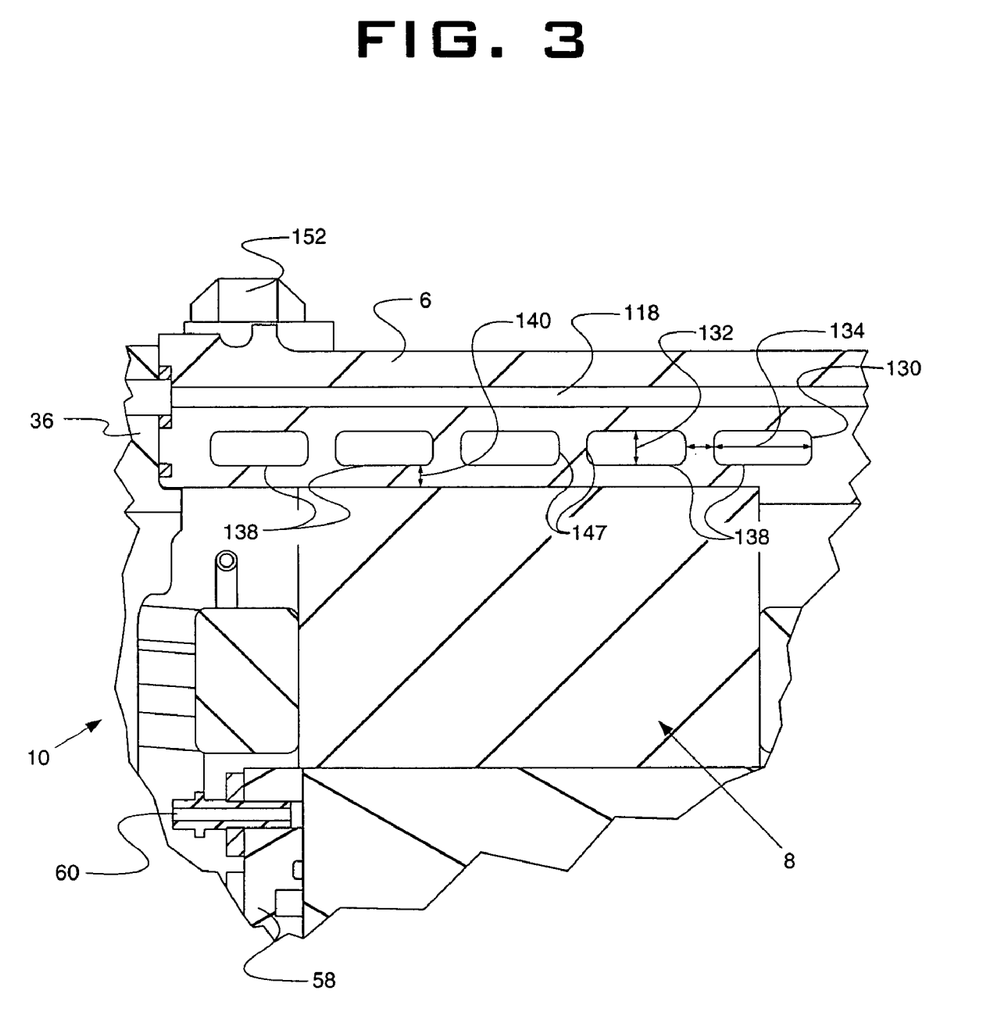
FIG. 3 is an enlarged portion of a cross-section of the device of FIG. 1.

In one embodiment, and referring primarily now to FIG. 3, the electric device includes, as part of the overall cooling strategy for the device, a fluid cooling system that includes generally a helical conduit 130 that is integrated into the rear housing 6. For example, as shown in FIG. 3, the rear housing 6 includes a helical conduit 130 having a substantially rectangular cross-section with a first, radial dimension 132 and a second, elongated, axial dimension 134, the helical conduit 130 being disposed coaxially along an axis. By integrating the cooling conduit 130 into the housing 6, the device limits the number of necessary components, and eliminates leakage that may occur at the various seals necessary in conventional cooling arrangements.

With a helical conduit, heat can be pulled directionally away or towards a particular zone. This is useful when dealing with a thermal gradient over the surface that is to be cooled. And, even though a helical shape is the most preferred geometry for reasons of low pressure drop as compared to other conduit designs, heretofore, it has been difficult to cast spirals embedded inside the casting. As a result, manufacturers have resorted to casting circular conduits inside castings which are connected to each other at junction points, thus creating unnecessary pressure drops and the cooling fluid not being used optimally to conduct away heat. Generally, the inability to cast spiral grooves pushes many manufacturers to cast a continuous annular ring instead of a spiral or helical conduit.

The core design of the present disclosure allows a smooth helical groove to be cast inside a housing 2. In a typical integral generator/motor housing the cooling grooves are integrated inside the housing. A helical conduit design offers the least pressure drop across its length compared to other cooling groove patterns (like circular and axial), which are easier to cast internally. The core 350 of the present disclosure may be made of compacted sand.

A pattern of the conduit 130 made of suitable material will have core prints that create registers within the molds for the sand cores. The cores, sometimes reinforced by wires, are used to create under cut profiles and cavities which cannot be molded with a traditional cope and drag, as with the present innovation, for the interior passages of valves or cooling passages in generator/motor housing, for example.

Figure 4:
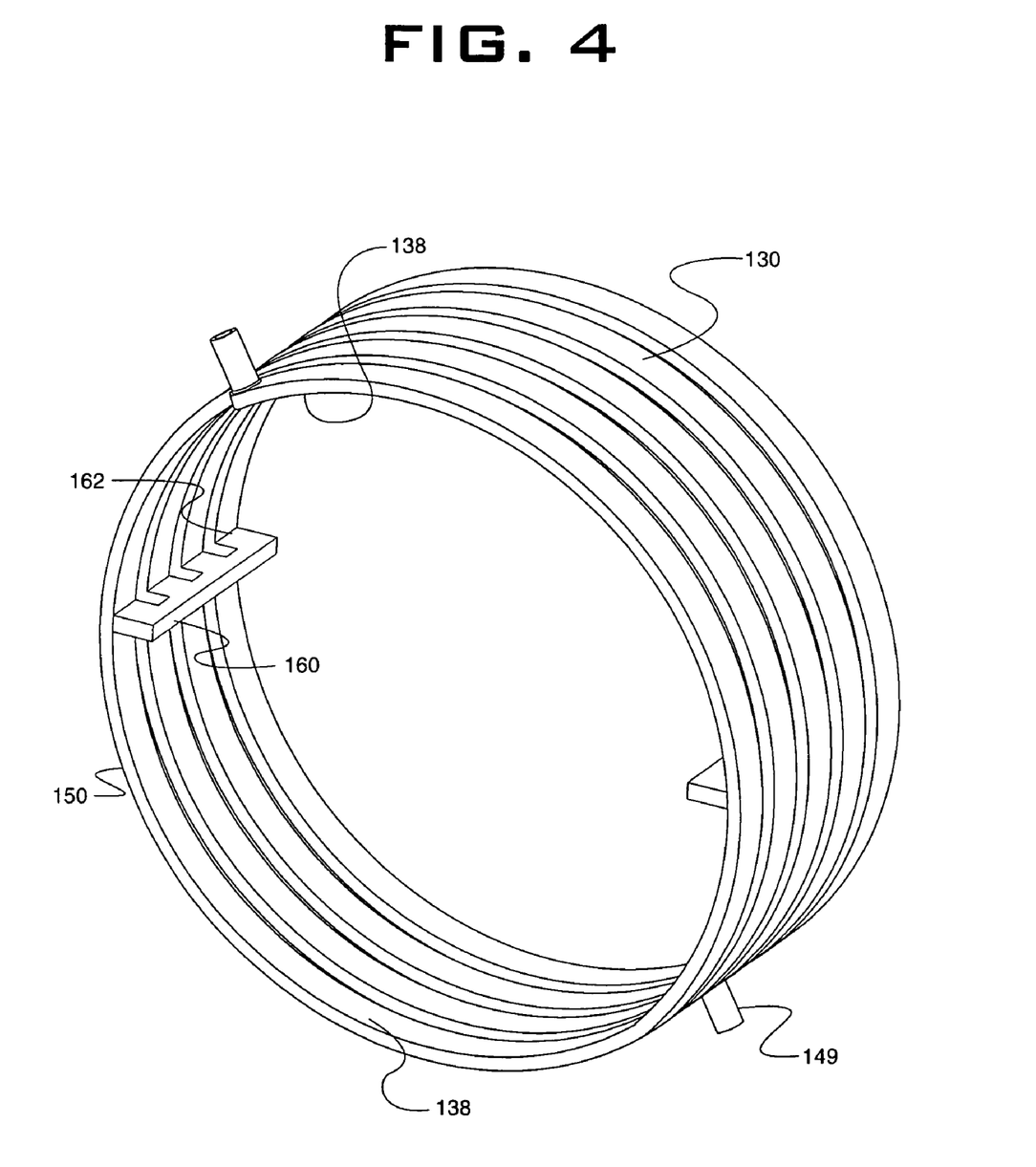
FIG. 4 is a perspective view of an helical cooling conduit core in accordance with one embodiment of the present disclosure.

Referring now to FIG. 4, shown is an exemplary helical conduit 130 core, having four and one half helical turns 150, a pitch of 40 mm, and a distance of 180 mm from end to end. Further, the helical conduit core has two or more tabs 160 along the axial length of the conduit, which may be continuously connected, each turn of the spiral being connected to the core print tab at two or more locations by circular sections. As would be understood by one skilled in the art, core print refers to the tab and the circular interconnection between the helical coil spiral and the tab 160. The two or more tabs 160 provide rigidity in both the axial and radial direction, and the core print is required to support the helical coil core in a cope and drag mold. The interconnect 162 between the tabs 160 and the spiral band of the helical conduit 130 can be any cross-section (circular, elliptical or rectangular). The exemplary core in FIG. 4 includes rounded rectangular tabs 160. Helical conduit core with interconnecting continuous tabs 160 provides rigidity in axial and radial directions and is a one-piece design. However, as would be understood by one with skill in the art, the tabs 160 may also provide location for split of the core into two sections.

The helical conduit 130 includes an inner surface 138 and an outer surface. At either end of the conduit 130, there is provided a connection tube 149 extending outwardly from the outer surface. The tubes 149 may be welded to the conduit 130, and serve as inlet and outlet connections. The inlet, not shown, may be positioned gravitationally above the outlet 154 (FIG. 1), with either or both being provided with a threaded connector. In an alternative embodiment, not shown, the helical conduit may end in a complete turn, with the tubes extending outwardly from junction boxes, and axially aligned on the same side of the generator housing 2.

In one embodiment, shown in FIG. 4, the conduit may only have two tabs 160. However there may be more than two tabs 160 if the outer diameter (O.D.) of the helical conduit trajectory is large and to enhance rigidity. One of skill in the art would readily appreciate that the specifications, including, without limitation, the length of the helix, number of turns, number of tabs, pitch, distance between coils, conduit wall thickness, and cross-sectional dimensions may be altered to a fit a variety of applications, depending on, for example, the size, weight and cooling requirements of any specific generator. Moreover, the helical conduit 130 (and thereby the helical conduit core 350) does not need to be uniform with respect to any of these characteristics. For example, the pitch, cross-sectional dimension, and even the diameter of individual coils may vary. For example, in one embodiment, the helical conduit 130 or core 350 may be a conical helix (not shown), wherein each successive turn has a decreasing diameter.

Figure 5:
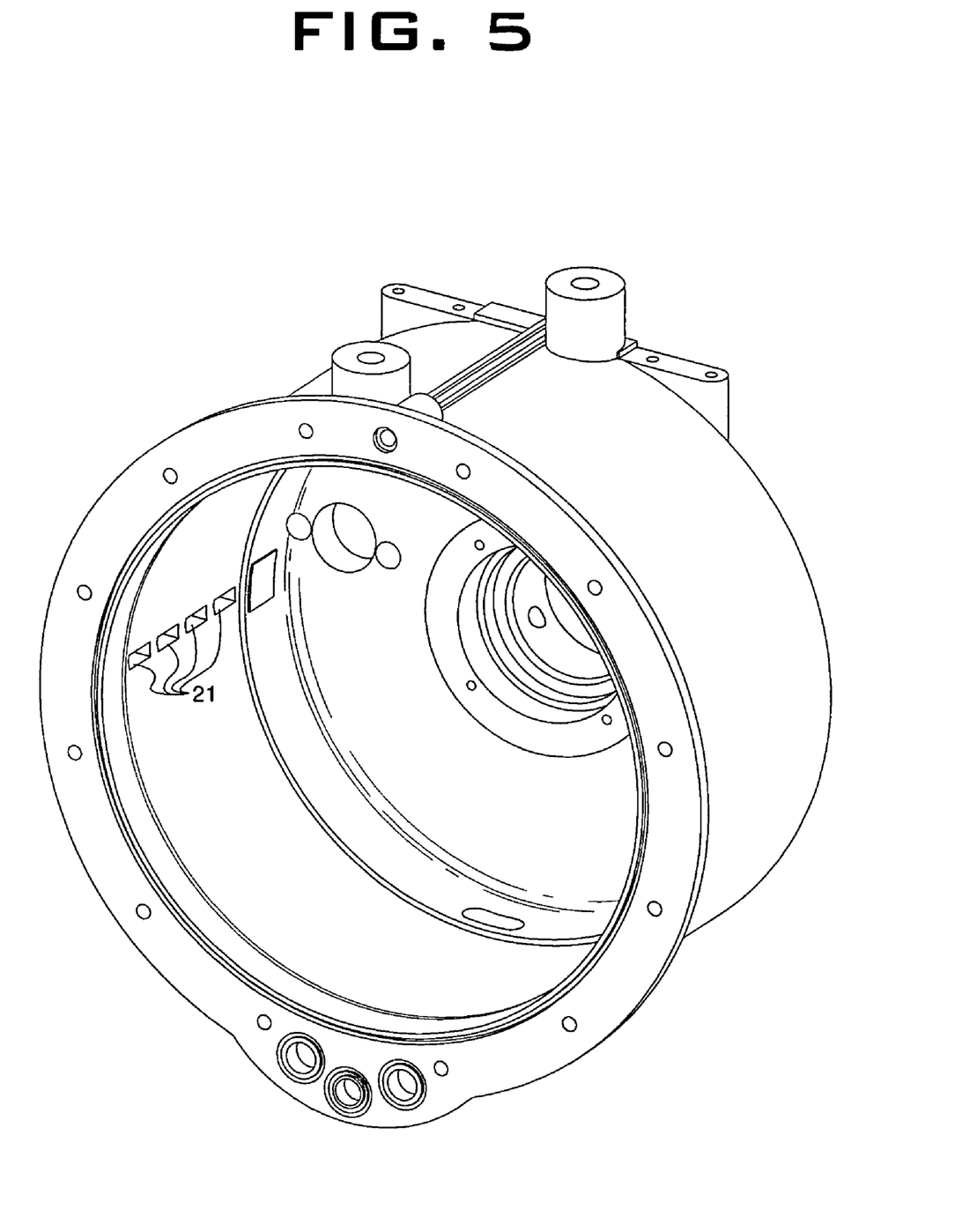
FIGS. 5 and 6 are perspective views of an embodiment of a housing in accordance with the present disclosure.
Figure 6:
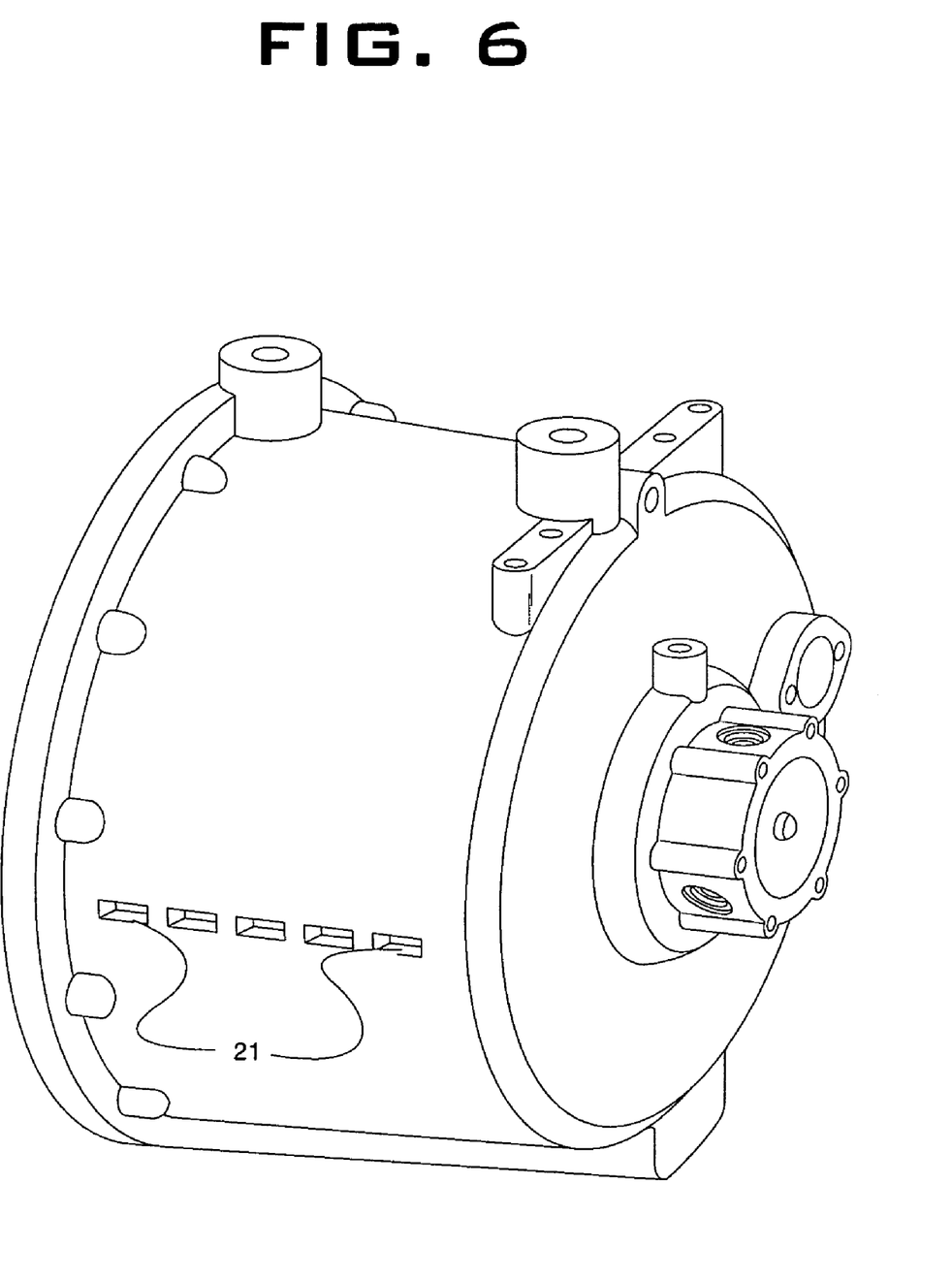

Further, the core print tabs 160 may be located on the inside, as shown in FIG. 5, or on the outside of the helical conduit 130. Outer tabs 160 require access core holes on the outer surface of the housing (see FIG. 6). Outer core holes 25 may prevent water-enhanced glycol (WEG) and stator lamination interactions. This might be preferred when using WEG as a coolant. Contrastly, inner (internally facing) tabs 160 may be advantageous when housings are oil cooled. The tabs 160 may be located anywhere along the path of the conduit coil 130 and would advantageously be placed along opposing sides of the conduit 130.

The present design provides support to the helical conduit 130 core by having two or more continuous inner tabs 160 running along the length of the spiral. As would be understood by those skilled in the art, this also may provide support to the core and a linear reference so core-shift errors are minimized.

One method of casting is sand or ablation processing. This process yields itself well to the helical conduit geometry because of the simplicity. Additionally, ablation casting may provide better material properties, which may be advantageous for generator housing designs. Further, sand casting provides superior (low) porosity properties, which may also assist in preventing cross talk between the cooling spirals.

In sand casting or permanent mold, the conduit 130 may involve a spiral core helical core 350 embedded into the casting. The spiral conduit core 130 may be adapted to each unique casting process requirement. For example, some cores require additional support points and some may require additional fill holes and some cores may be split, as would be understood by one skilled in the art. Regardless, the basic core concept is retained by modifications made to adapt to different casting processes, such as lost foam or the like.

The core design of the present disclosure allows a smooth helical groove to be cast inside a housing 2. In a typical integral generator/motor housing the cooling grooves are integrated inside the housing. A helical conduit design offers the least pressure drop across its length compared to other cooling groove patterns (like circular and axial), which are easier to cast internally.

As illustratively shown in FIG. 5, the present disclosure teaches a generator housing 2 with a plurality of core print or access holes 21 on the inner surface 22 of the housing 2. This allows access for cleaning the casting of any sand. Once the cleaning is done, the housing bore 42 is machined. A stator coil may then be press-fitted into the housing bore, thus closing the holes. An advantage of this machining operation is that it cleans up the surface and provides a clean sealing surface when stator laminations are press-fitted into the bore.

The access holes 21 may extend into the un-machined area 23 of the housing. As would be understood, welding a plate (see FIG. 5), inserting a plug, or placing another cover onto the opening can close any access holes 21 in the un-machined area 23 of the inner surface 22 of the housing.

Further, windings may be placed into the stator slots (not shown) and subsequently vacuum pressure impregnated. This seals the leak paths of oil from the cooling groove. An advantage of sealing of the core openings or access holes 21 with stator laminations is that the sealing occurs without adding any additional parts, thus reducing cost and time of manufacture and increasing throughput.

As discussed above, in one embodiment, shown in FIGS. 3-5, the conduit 130 has a rectangular cross-section, elongated axially. However, a variety of other cross-sectional dimensions may be employed. For example, the helical conduit 136 may be cylindrical with a circular cross-section. However, the rectangular cross-section may be advantageous for a number of reasons. First, as shown in FIG. 4, the rectangular cross-section may provide a greater surface area along an inner surface 138, at a constant distance 140 from inner housing surface 22, which may facilitate heat exchange.

In addition, the rectangular configuration may have certain advantages in the manufacturing process due to the substantially uniform distance 142 between the sidewalls 147 of adjacent coils. In the case of a cylindrical conduit, the varying distance between coils may be susceptible to the formation of voids between the conduits, and hence may require a larger spacing between coils to reduce any radial thermal differential during the solidification of casting.

As illustrated, the helical conduit 130 is integral to the rear housing 6 in that the coils themselves are completely enclosed therein. In another embodiment (not shown), the helical conduit 130 may be substantially, but not completely enclosed, with a portion of the conduit 130 exposed to either the inner housing cavity 12, or to the external environment outside the housing. For example, the inner surface 138 of the conduit 130 may be coextensive with inner surface 22 of the housing.

In operation, a cooling system may include a pump (not shown) which is fluidly connected to inlet 152 to provide a circulating coolant, such as water, an ethylene glycol solution, or the like. The system may also include a heat exchanger to remove heat from the coolant prior to circulating the coolant back through the device 1. A pump may be dedicated to providing coolant for the electric device 1, or the system may also be fluidly connected to other components, such as an engine fluid jacket or oil heat exchanger (not shown).

INDUSTRIAL APPLICABILITY

The disclosed electric machine finds potential application in any power system where it is desirous to control heat dissipation within a switched reluctance electric machine. The disclosed SR electric machine finds particular applicability in vehicle drive systems. One skilled in the art will recognize that the disclosed SR electric machine 16 could be utilized in relation to other drive systems that may or may not be associated with a vehicle. When the drive system of this disclosure is in operation, the cooling media, conditioned by a heat exchanger, may be pumped through power source and/or SR electric machine.

It will be appreciated that the foregoing description provides examples of a novel cooling method for an electric machine. However, it is contemplated that other implementations of the disclosure may differ in detail from the foregoing examples, as would occur to those skilled in the art. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values or dimensions herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

The housing designs of the present disclosure may be used in connection with various electric devices to provide fluid cooling with fewer components, and at a potentially lower cost than conventional designs. Moreover, the fact that there are no internal seals between the coolant passages and the interior of the device may result in improved performance and lifespan of the device by preventing leakage that may occur when such seals fail. In particular, the housings may be used in connection with electric devices such as, for example, motors, alternators and generators.

Such electric devices may be used in connection with any machine that requires the generation of electrical power from a mechanical input, or mechanical power from an electrical input. This may include mobile machines such as construction, passenger and recreational vehicles, trucks, and watercraft. These devices may also be employed in mobile industrial machinery, such as that used in mining, construction, farming, transportation, or any other industry known in the art. This may include earth moving machines such as dozers, wheel loaders, excavators, dump trucks, backhoes, motorgraders and the like. In particular, the disclosed SR electric devices may find applicability in the drive systems of such vehicles. It should be recognized that a wide variety of applications, mobile and stationary, might fall within the scope of the present disclosure.

Other aspects, objects, and advantages of the present disclosure can be obtained from a study of the drawings, disclosure and the appended claims.

What is claimed is:

1. A fluid-cooled housing for an electric device, comprising:
   an outer surface and an inner surface, the inner surface defining, at least in part, a housing cavity having a longitudinal axis;
   an end wall continuous with the inner surface, thereby substantially enclosing the housing cavity at a first end thereof, the inner surface having a plurality of core print openings along the longitudinal axis; and
   a helical channel formed by casting within the housing between the outer and inner surfaces along the axis, the helical channel formed from a helical coil core made of compacted sand and having two or more laterally extending tabs which form the core print openings, the helical coil core being positioned between cope and drag molds prior to casting, the helical channel being formed by material forming the housing without any separate conduit material being used.

2. The housing of claim 1, wherein the helical conduit has a rectangular cross-section.

3. The housing of claim 2, wherein the rectangular cross-section is defined by a first elongated dimension disposed substantially parallel to the axis.

4. The housing of claim 1, wherein the helical conduit has two or more core print holes per turn of the spiral, opening to the inside.

5. The housing of claim 1, wherein the helical conduit has two or more core print holes per turn of the spiral, opening to the outside.

6. The housing of claim 3, wherein the conduit further comprises an outer surface and a first end, a tube fluidly connected to the conduit in the proximity of the conduit end and extending substantially perpendicular to the outer surface of the conduit and is in the inlet for the coolant.

7. The housing of claim 6, wherein the tube extends beyond the outer surface of the housing and is the outlet for the coolant.

8. The housing of claim 1, wherein the conduit has a first end and a second end that extends outward from the outer surface of the housing with the coolant entering one end, passing through the spiral and exiting through the other end.

9. A fluid-cooled housing for an electric device, comprising:
   an outer surface and an inner surface, the inner surface defining a housing cavity having a longitudinal axis;
   an end wall continuous with the inner surface, thereby substantially enclosing the housing cavity at a first end thereof, the inner surface having a plurality of core print opening along the longitudinal axis; and
   a helical channel formed with the housing between the outer and inner surfaces along the longitudinal axis, the helical channel being cast into the housing without any separate conduit or material being embedded in the housing to form and define the helical channel, the helical channel being cast into the housing without any mechanical machining or milling.

10. The fluid-cooled housing for an electric motor/generator of claim 9, wherein the helical channel is a conical helix having successive turns of decreasing diameter.

\* \* \* \* \*